(12) United States Patent
Ronsen

(10) Patent No.: US 10,017,098 B2
(45) Date of Patent: Jul. 10, 2018

(54) APPARATUS AND METHOD FOR A REAR SLIDE-OUT COMPARTMENT IN A RECREATIONAL VEHICLE FOR INCREASING INTERIOR SPACE

(71) Applicant: David Ronsen, Encinitas, CA (US)

(72) Inventor: David Ronsen, Encinitas, CA (US)

(73) Assignee: Delphini, LLC, Carlsbad, CA (US)

( * ) Notice: Subject to any disclaimer, the term of this patent is extended or adjusted under 35 U.S.C. 154(b) by 0 days.

(21) Appl. No.: 15/272,151

(22) Filed: Sep. 21, 2016

(65) Prior Publication Data
US 2018/0079348 A1    Mar. 22, 2018

(51) Int. Cl.
*B60P 3/39*   (2006.01)
*B60P 3/34*   (2006.01)

(52) U.S. Cl.
CPC .. *B60P 3/39* (2013.01); *B60P 3/34* (2013.01)

(58) Field of Classification Search
CPC .......... B60P 3/34; B62D 33/08; B62D 63/061
USPC ............. 296/165, 171, 172, 175, 176, 26.09
See application file for complete search history.

(56) References Cited

U.S. PATENT DOCUMENTS

| | | | |
|---|---|---|---|
| 5,127,697 A * | 7/1992 | St Marie ................... | B60P 3/38 296/16 |
| 6,257,638 B1 * | 7/2001 | Graber ...................... | B60P 3/34 296/26.01 |
| 6,561,570 B2 * | 5/2003 | Gehman ................... | B60P 3/34 296/171 |
| 8,534,735 B2 * | 9/2013 | McManus .............. | B62D 31/00 296/26.08 |

* cited by examiner

*Primary Examiner* — Joseph D. Pape

(57) ABSTRACT

A recreational vehicle (RV) includes a slide-out compartment that increases a size of an interior living space. The slide-out compartment extends from and retracts into a rear side of the RV. The slide-out compartment includes a plurality of panels coupled to a rear double door structure. The plurality of panels configured to extend from the RV in an open state and recede into the RV in a closed state. The double door structure is configured to recess into a rear door jamb of the RV and form a weather seal with the rear door jamb when the slide-out compartment is in a closed state and detach from the door jamb when the when the slide-out compartment is not in a closed state.

19 Claims, 6 Drawing Sheets

APPARATUS AND METHOD FOR A REAR SLIDE-OUT COMPARTMENT IN A RECREATIONAL VEHICLE FOR INCREASING INTERIOR SPACE

TECHNICAL FIELD

This application relates to the rear expansion of a recreational van, and more specifically to a rear slide-out compartment that extends past the rear end of the profile of the van.

BACKGROUND

Recreational vans, such as American recreational vans, are used to provide a mobile shelter for activities such as traveling and camping. A typical user of a recreational van desires a maximal amount of living space for comfort and relaxation. The functionality of the recreation van incorporates amenities, such as a kitchen and a bed, reducing the amount of living space.

SUMMARY

This disclosure provides a method and system for a rear slide-out compartment at the rear side of a van style vehicle.

In certain embodiments, a recreational vehicle (RV) is provided. The RV includes a rear panel structure and a slide-out compartment configured to extend from a rear side of the RV. The slide-out compartment is also configured to increase a size of an interior living space. The slide-out compartment includes a plurality of panels coupled to the rear panel structure. The plurality of panels configured to extend from the RV in an open state and recede into the RV in a closed state. The rear panel structure is configured to recess into a rear door jamb of the RV and form a weather seal with the rear door jamb when the slide-out compartment is in a closed state and detach from the door jamb when the when the slide-out compartment is not in a closed state.

In certain embodiments, a method for expanding a living area in a recreational vehicle (RV) is provided. The method includes forming a slide-out compartment. The slide-out compartment is configured to extend from a rear side of the RV and to increase a size of an interior living space. The slide-out compartment includes a plurality of panels coupled to a rear panel structure. The method also includes coupling the slide-out compartment to the RV. The plurality of panels is configured to extend from the RV in an open state and recede into the RV in a closed state. The rear panel structure is configured to recess into a rear door jamb of the RV and form a weather seal with the rear door jamb when the slide-out compartment is in a closed state and detach from the door jamb when the when the slide-out compartment is not in a closed state.

In certain embodiments, an extension unit for use with a recreational vehicle (RV) is provided. The extension unit includes a rear panel structure and a plurality of panels coupled to the rear panel structure. The plurality of panels is configured to extend from the RV in an open state and recede into the RV in a closed state. The rear panel structure is configured to recess into a rear door jamb of the RV and form a weather seal with the rear door jamb when the extension unit is in a closed state and detach from the door jamb when the when the extension unit is not in a closed state. The extension unit is configured to extend from a rear side of the RV and increase a size of an interior living space.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged vehicle system.

Recreational vehicles (RVs) include living space and amenities, such as a kitchen, bathroom, and sleeping facilities. For the most comfort, expanding the living space inside the recreational van enhances the passenger comfort. Recently, recreational vehicles are being equipped or modified to increase the living space to compete with the luxuries of a homes and cabins, but still maintain a small profile on the road and possess a better fuel efficiency. Embodiments of the present disclosure provide a method and an apparatus for an RV that includes slide-out compartments configured to extend from the rear of the RV for increasing the living space within the RV.

Figure 1A:
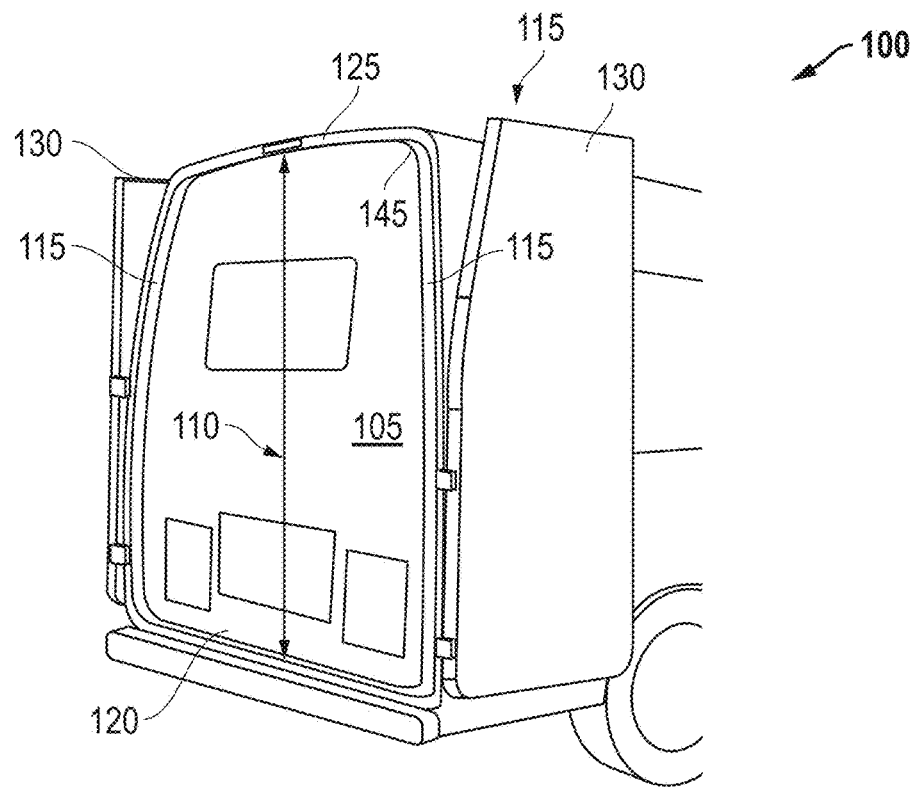
FIGS. 1A and 1B illustrate a double door recreational van with a cabin extension unit according to the present disclosure.
Figure 1B:
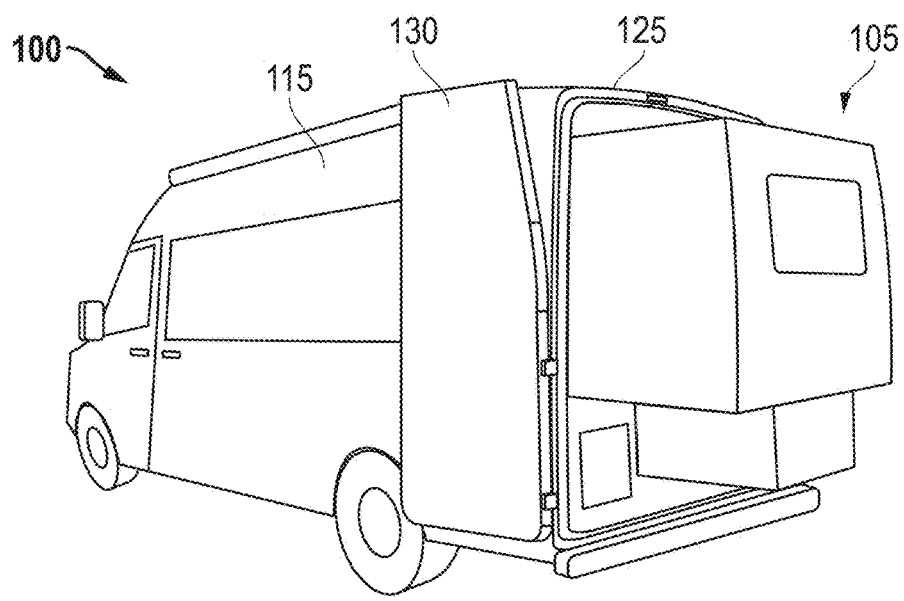

FIGS. 1A and 1B illustrate a recreational van 100 with a cabin extension unit 105 according to the present disclosure. The embodiments of the doors shown in FIGS. 1A and 1B are for illustration only. Other embodiments could be used without departing from the scope of this disclosure.

In certain embodiments, the RV 100 is a Minibus, which is a five to twenty passenger bus or multipurpose passenger vehicle, as termed by the Department of Transportation. In certain embodiments, the RV is a Class A motorhome; Class B motorhome (campervan); and a Class C motorhome.

Certain RV's 100 include a cabin extension unit 105. The cabin extension unit 105 can be extended from the RV 100 to provide additional living space when extended. The cabin extension unit 105 is configured to slide in and out of a first interior area 110 defined by the exterior side panels 115, floor 120 and roof 125 of the RV 100. When in a closed position, as shown in FIG. 1A, the cabin extension unit 105 can be completely enclosed by rear doors 130 of the RV 100. However, in order to extend the cabin extension unit 105, as illustrated in the example shown in FIG. 1B, the rear doors 130 must be opened, which requires additional exterior lateral space to deploy the cabin extension unit 105. In addition, in order to fully enclose the cabin extension unit 105 in the closed position, an exterior portion of the cabin extension unit 105 must be dimensioned to be smaller than the first interior area 110 of the RV 100. Therefore, an interior of the cabin extension unit 105 must be substantially smaller than the first interior area 110 of the RV 100. Additionally, in order to fully enclose the cabin extension unit 105 in the closed position, no objects may be stored on the sides or flooring of the first interior area 110 of the RV 100.

Figure 2A:
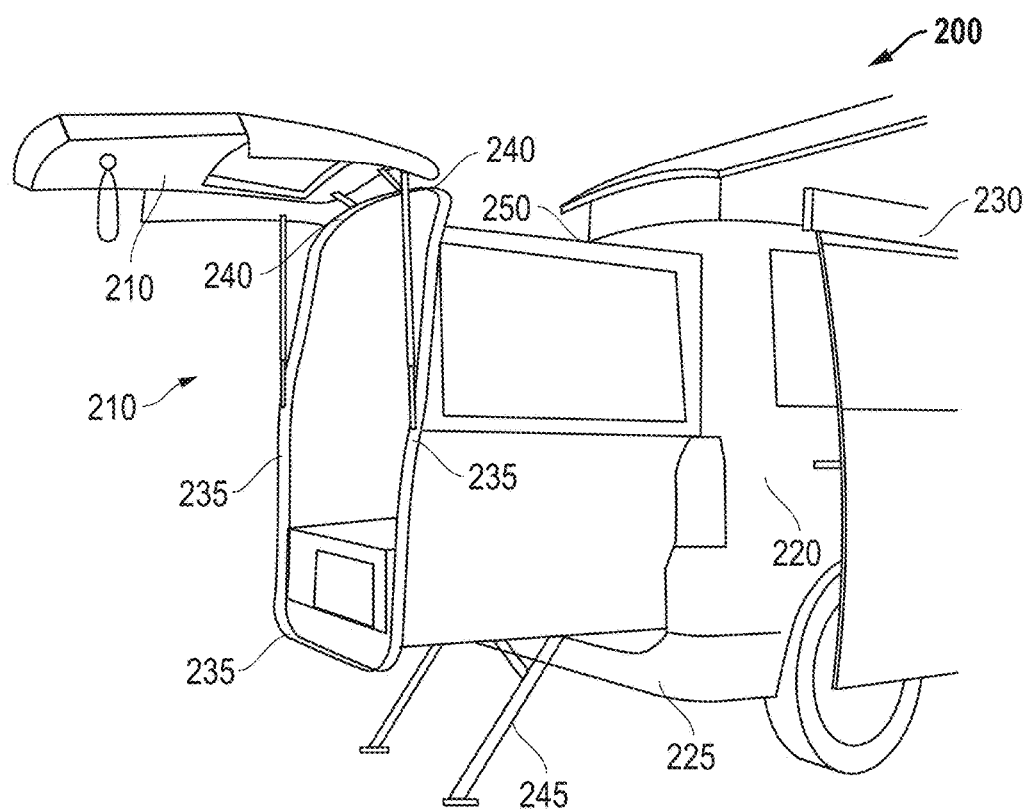
FIGS. 2A and 2B illustrate a recreational van with a cabin extension unit with a rear panel comprising a single door according to the present disclosure.
Figure 2B:
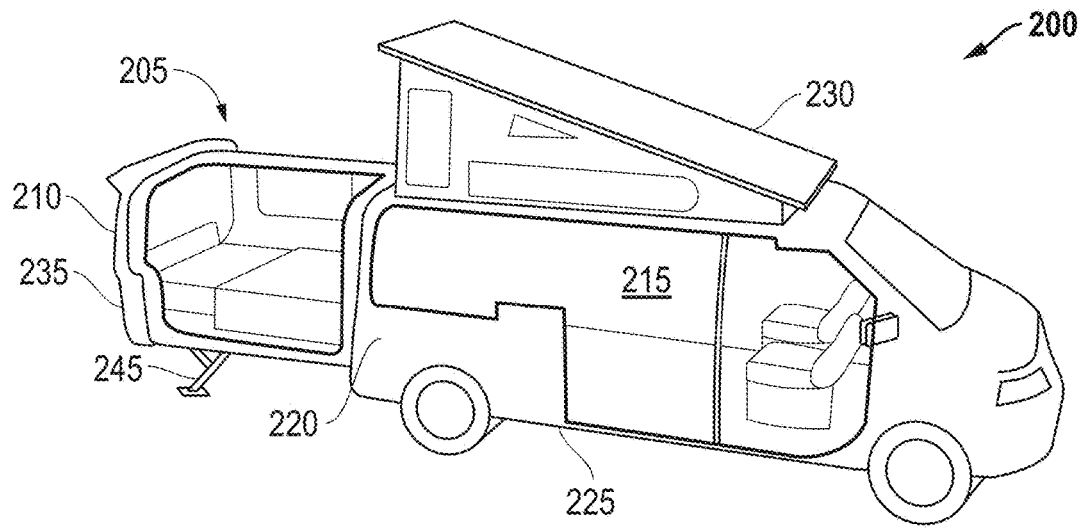

FIGS. 2A and 2B illustrate a recreational van 200 with a cabin extension unit 205 with a rear panel comprising a single door according to the present disclosure. The embodiments shown in FIGS. 2A and 2B are for illustration only. Other embodiments could be used without departing from the scope of this disclosure.

Certain RV's 200 include a cabin extension unit 205, such as a slide-out compartment, in which a rear door 210 forms the rear panel of the cabin extension unit 205. The cabin extension unit 205 can be extended from the RV 200 to provide additional living space when extended. The cabin extension unit 205 is configured to slide in and out of a first interior area 215 defined by the exterior side panels 220 floor 225 and roof 230 of the RV 200. The cabin extension unit 205 includes a door frame 235 with a hinge 240 to enable the rear door 210 to open in a vertical direction. When in a closed position, as shown in FIG. 2A, the cabin extension unit 205 is completely enclosed within the RV 200 and the rear surface of the cabin extension unit 205 operates as the rear door 210 of the RV 200. However, since the rear door 210 is coupled to the cabin extension unit 205 via the hinge 240 located on a roof edge, a seam 250 is disposed surrounding a connection point between the door frame 235 and the exterior side panels 220 floor 225 and roof 230 of the RV 200, as well as on a top surface of the RV 200, which can allow moisture to seep into an area between an exterior surface of the cabin extension unit 205 and first interior area 215, which can lead to mold or equipment issues from too much moisture or require additional weather seals. Additionally, in order to fully enclose the cabin extension unit 205 in the closed position, no objects may be stored on the sides or flooring of the first interior area 215 of the RV 200. For example, when in a closed position, the sides and flooring of the cabin extension unit 205 slide along and rest along an inner side of the sides and floor of the RV 200. Therefore, a portion of the first interior area 215 is non accessible or non-usable when the cabin extension unit 205 is in a closed position. As shown in FIG. 2B, the cabin extension unit 205 includes a footer support 245 for stability. The footer support 245 is configured to retract up beneath the cabin extension unit 205. In addition, when the cabin extension unit 205 is extended, to open the rear door 210 requires additional weather seals to provide proper prevention of moisture or heat (or cool) vapor through the door seams 255. Further, in order to open the rear door 210 additional horizontal and vertical space is required to allow the rear door 210 to rotate about its hinges 240.

Figure 3:
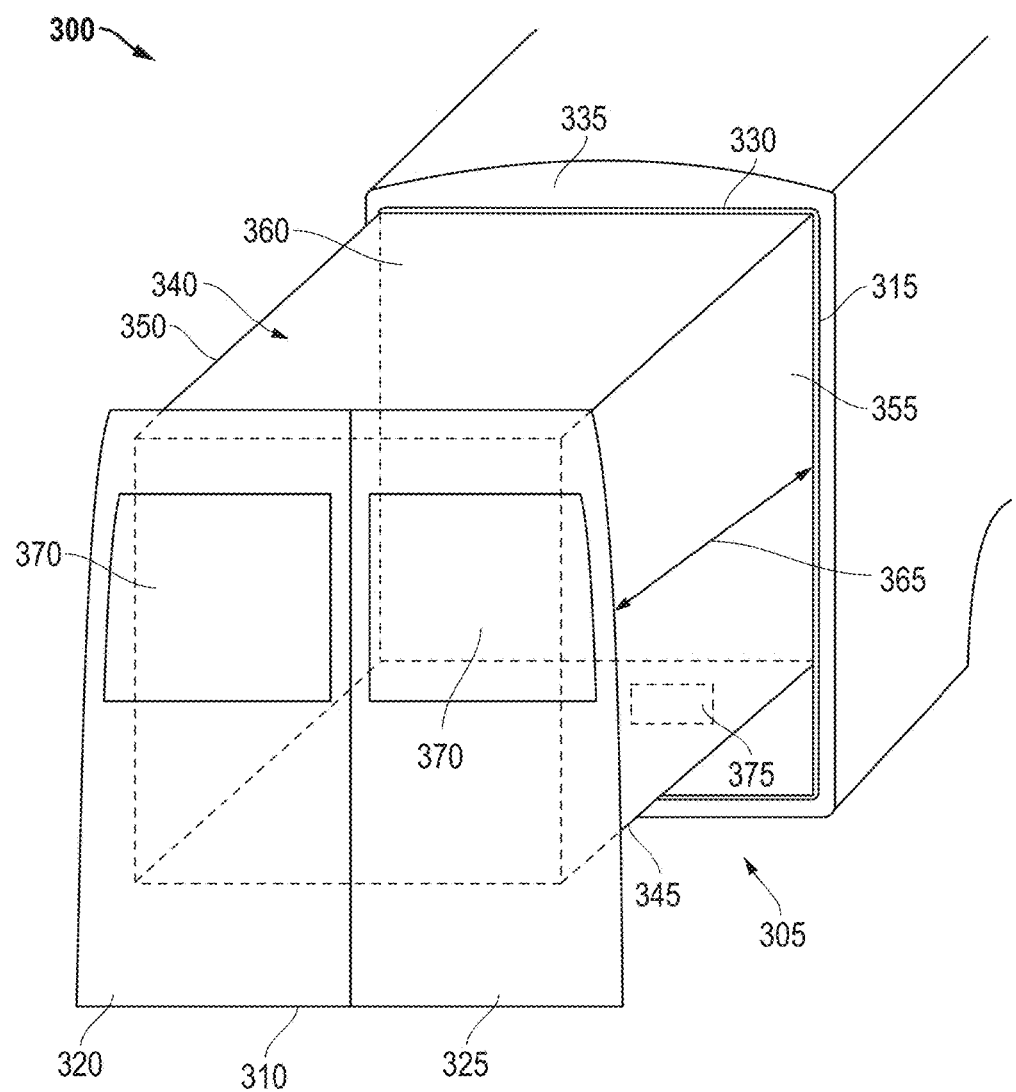
FIG. 3 illustrates a recreational van with a slide-out compartment with a double door configured as a rear surface according to embodiments of the present disclosure.

FIG. 3 illustrates a recreational van 300 with a slide-out compartment 305 with a double door 310 configured as a rear surface according to embodiments of the present disclosure. The embodiment of the slide-out compartment 305 shown in FIG. 3 is for illustration only. Other embodiments could be used without departing from the scope of this disclosure.

In certain embodiments, an RV 300 includes a double door slide-out compartment 305 configured to maximize interior living space in a closed and open position. The slide-out compartment 305 is dimensioned to fit within a via 315 on a back surface of the RV 300. The slide-out compartment 305 is slideably coupled to the RV 300. The slide-out compartment 305 slides out away from the RV 300 into an open state and slides into the RV 300 to enter a closed state. The rear slide-out compartment 305 extends from a rear of the RV 300 when in an open position. When in a closed position, the rear slide-out compartment 305 is recessed within the RV 300 and operates, or merges, with other components within the RV 300 to provide comfortable living space as well as reduced profile for a driving operation of the RV 300 or parking in confined spaces.

The rear surface of the slide-out compartment 305 includes double doors 310. In certain embodiments, the via 315 is a door opening. The double doors 310 include a first door 320 and a second door 325. In certain embodiments, the double doors 310 are fixed and immovable. In certain embodiments, one or more of the double doors 310 are configured to rotate about a respective hinge. In a closed position, the double doors 310 recess into the via 315 such that, when in the closed position, the exterior surfaces of the double doors 310 are flush with the exterior side of the RV 300. The via includes a door jamb 330 dimensioned to accommodate both the first door 320 and the second door 325 of the double door 310. In certain embodiments, the slide-out compartment 305 is configured to fit within the opening formed in an existing double door jamb 330 for the RV 300. For example, the double doors 310 can be formed from the previous double doors 310. The previous hinges can be removed or otherwise rendered in operable.

In certain embodiments, instead of a double door 310 structure, the slide-out compartment 305 includes a customized panel. The customized rear panel can be a single planar surface, can include one or more curves, grooves, channels or windows. In certain embodiments, the customized rear panel includes a single door or multiple doors.

The RV 300 includes a weather seal 335 configured to inhibit a flow of liquid or gaseous matter through the door jamb 330 or via 315. In certain embodiments, one or both of the door jamb 330 is modified to be wider, taller, or both, to expand the living space that the slide-out compartment 305 adds to the RV 300.

In certain embodiments, the slide-out compartment 305 is self-supporting when in an open state. The slide-out compartment 305 includes a rigid construction configured to support the weight of multiple persons and cargo. The slide-out compartment 305 and RV 300 are dimensioned such that, when the slide-out compartment 305 is in an open state, a moment of the RV 300 is not substantially altered and maintains positive contact between the ground and each respective wheel. For example, as opposed to the cabin extension unit 205, which requires the footer support 245 for stability (shown in FIG. 2B), the slide-out compartment 305 can be deployed to a fully open state without requiring additional footer support. The slide-out compartment 305 includes a plurality of panels 340 and a rear panel, which is configured as the double doors 310. The slide-out compartment 305 is configured to fit securely in the via 315 and door jamb 330 to establish a substantial weather seal of the interior of the RV 300.

The plurality of panels 340, in conjunction with the double doors 310 forms the body of the slide-out compartment 305 and the expansions of the living area contained within. The plurality of panels 340 are configured with an outer surface dimensioned to snugly fit within the via 315 of the RV 300 and enclose the living space. The double doors 310 are configured to compress on the weather seal 335. Additionally, the plurality of panels 340 can be configured to compress an additional weather seal surrounding a contact edge of the via 315. The plurality of panels 340 includes a bottom panel 345, a first side panel 350, a second side panel 355, and a top panel 360. The bottom panel 345 extends from a first side of the via 315 to a second side of the via 315 and from an interior edge of the slide-out compartment 305 for a length 365. The first side panel 350 and second side panel 355 are contoured to form a weather seal with the via 315. The first side panel 350 and the second side panel 355 extend vertically from the bottom panel 345 to the top panel 360 and extend from an interior edge of the slide-out compartment 305 for the length 365. The length 365 of the slide-out compartment 305 is dimensioned such that plurality of panels 340 does not interfere with the existing components or floor space of the RV 300 when the slide-out compartment 305 is in a retracted position, such as in a closed state. In certain embodiments, the length 365 is between four to six feet.

In certain embodiments, the double doors 310 are a fabricated surface enclosing the living space of the slide-out compartment 305. In certain embodiments, the double doors 310 include one or more windows 370. The window 370 can be comprised of glass, PLEXIGLASS, or any suitable transparent material. In certain embodiments, the first door 320 includes a window 370 and the second door 325 includes a window 370. In certain embodiments, only one door includes the window 370 are contemplated within the scope of this disclosure. In certain embodiments, the window 370 can encompass substantially the entire respective door to which it is included. For example, the door can be comprised of a frame configured and reinforced to secure the window 370. In certain embodiments, the windows 370 are disposed to provide an operator of the RV 300 the ability to see if a person or other object is standing in the way of the slide-out compartment 305 thereby prohibiting the operator from operating the slide-out compartment 305 in order to avoid possible injuries to the persons or objects standing in the way of the RV 300 or the slide-out compartment 305. In certain embodiments, the double door 310 structure includes one or more single doors or multiple doors. The one or more single doors or multiple doors can provide access to the interior of the van, to one or more storage compartments, one or more equipment compartments, or any other structural components of the RV 300.

In certain embodiments, the sides of the door jamb 330 are modified to increase the width of the bottom panel 345 and the top panel 360. In other embodiments, the top of the door jamb 330 is modified to increase the width of the first side panel 350 and the second side panel 355.

In certain embodiments, the door jamb 330 or the via 315 includes one or more weather seals 335 disposed to be, when in a closed state, between the edges of the via and the plurality of panels 340 or inside the door jamb 330 and the double doors 310. The weather seals 335 provide a weatherproof capability for the slide-out compartment 305 to inhibit the effects of adverse weather, such as cold, wind and rain, from traversing through the rear of the slide-out compartment 305 and to dampen the sound when the double doors 310 contacts the door jambs 330 due to vibrations or to dampen sound resulting from wind noise.

In certain embodiments, the RV 300 includes a deployment system configured to extend and retract the slide-out compartment 305. The deployment system includes one or more drive motors, actuators, gears, lever arms, process controllers and circuitry, or a combination thereof, configured to deploy or retract the slide-out compartment 305 by providing a mechanical force sufficient to open and close the slide-out compartment 305. The actuator can be electrical, hydraulic, pneumatic, or the like. The deployment system can be controlled by a driver of the RV 300 to enable the slide-out compartment 305 to be extended or retracted. In certain embodiments, the RV 300 also is configured with an emergency release for manual operation of the slide-out compartment 305.

Figure 4:
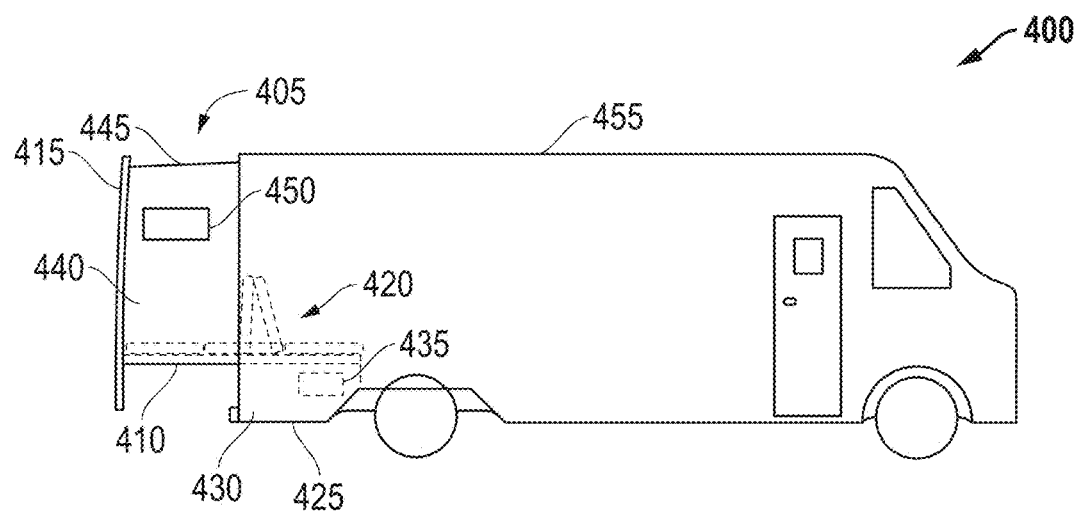
FIG. 4 illustrates a profile view of an RV with a slide-out compartment according to embodiments of the present disclosure.

FIG. 4 illustrates a profile view of an RV 400 with a slide-out compartment 405 according to embodiments of the present disclosure. The embodiment of the RV 400 shown in FIG. 4 is for illustration only. Other embodiments could be used without departing from the scope of the present disclosure. In the example shown in FIG. 4, the RV 400 can be the same as, or similar to, the RV 300 shown in FIG. 3 and the slide-out compartment 405 can be the same as, or similar to, the a slide-out compartment 305 shown in FIG. 3.

The RV 400 includes a slide-out compartment 405 that is configured to extend to provide additional interior living space and to retract when the RV 400 is in driving operation or parked in a confined space. The slide-out compartment 405 is slideably coupled to the RV 400. When deployed in an open state, a lower panel 410 extends from the RV 400 and couples to the rear double doors 415. The lower panel 410 can form a floor, or support surface, for the interior of the RV 400.

In certain embodiments, a fold-down seat 420 is disposed in, or coupled to, the slide-out compartment 405. The fold-down seat 420 is configured to expand into a bed, that is, a flat cushioned surface, as the slide-out compartment 405 deploys into the open state. The fold-down seat 420 includes three panels that form the flat surface when extended. In certain embodiments, the fold down seat 420 includes more than three panels. In certain embodiments, the fold-down seat 420 converts from the sofa configuration into the bed configuration as the slide-out compartment 405 is deployed into the open state. In certain embodiments, the fold-down seat 420 extends manually or automatically in response to a signal when suitable for a user of the RV 400. That is, when the slide-out compartment 405 is in the open state, the user may maintain the fold-down seat 420 in the sofa configuration until a desired time and then, via a manual operation or through an electro-mechanical operation, cause the fold-down seat 420 to convert to the bed configuration.

In certain embodiments, the rear double doors 415 extend vertically below the lower panel 410, such as by extending in a range from six inches to three feet. The lower panel 410 is configured to slide in a vertical position that is elevated from a floor board 425. The vertical position of the lower panel 410 provides for a storage or component area beneath the lower panel 410. For example, the RV 400 can include a storage area 430 beneath the lower panel 410 planar level and above the floor board 425. In certain embodiments, the storage area 430 is accessible only when the slide-out compartment 405 is in an open state. In certain embodiments, the storage area 430 is accessible regardless of whether the slide-out compartment 405 is in an open state or a closed state. In certain embodiments, one or more components are disposed in the storage area 430 or adjacent to the storage area 430. For example, in certain embodiments, a generator 435 is disposed beneath the lower panel 410 planar level and above the floor board 425.

The slide-out compartment 405 includes right and left side panels 440 and a top panel 445. The right and left side panels 440 can be form from a rigid material, accordion material, or flexible weather-tight fabric. In certain embodiments, the weather-tight fabric includes an insulation material configured to maintain a climate controlled space within the RV 400. In certain embodiments, one or more of the right and left side panels 440 includes a window 450. The window 450 can be comprised of glass, PLEXIGLASS, clear optical cast plastic, clear acrylic, clear vinyl, or any suitable transparent material. The top panel 445 is configured to drain moisture away from the RV 400 main body 455 and away from the rear double doors 415. The top panel 445 can have channels to direct water flow towards right and left side panels 440. The top panel 445 can include one or more slopes or curves to direct water flow towards right and left side panels 440.

Figure 5:
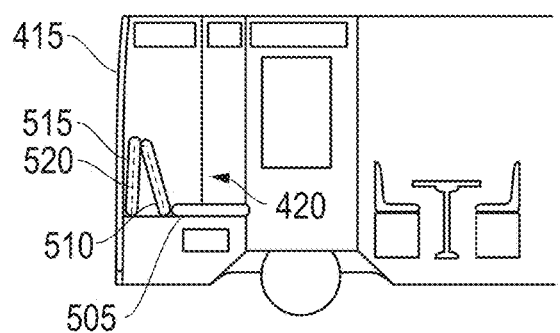
FIG. 5 illustrates another profile view of an RV with a slide-out compartment according to embodiments of the present disclosure.

FIG. 5 illustrates another profile view of an RV 400 with a slide-out compartment according to embodiments of the present disclosure. The embodiment of the RV 400 shown in FIG. 5 is for illustration only. Other embodiments could be used without departing from the scope of the present disclosure. In the example shown in FIG. 5, the RV 400 can be the same as, or similar to, the RV 300 shown in FIG. 3 and the slide-out compartment 405 can be the same as, or similar to, the a slide-out compartment 305 shown in FIG. 3.

The RV 400 includes a slide-out compartment 405 that is configured to extend to provide additional interior living space and to retract when the RV 400 is in driving operation or parked in a confined space. The slide-out compartment 405 is slideably coupled to the RV 400. When deployed in an closed state, a lower panel 410 recedes into the RV 400 and the rear double doors 415 couple to the RV 400 main body 455, such as by coupling in a door jamb. The lower panel 410 recedes: 1) below a seat planar level of the interior of the RV 400; or 2) above or into a roof of the storage area 430; or both.

In certain embodiments, a fold-down seat 420 is disposed in, or coupled to, the slide-out compartment 405. The fold-down seat 420 is configured to retract from a bed, that is, a flat cushioned surface, into a sofa seat as the slide-out compartment 405 retracts into the closed state. The fold-down seat 420 includes three panels. A first panel 505 forms a seat for a sofa and a second panel 510 forms a back of the sofa. The third panel 515 retracts and folds behind the second panel 510. Although the example of the fold-down seat 420 in FIG. 5 illustrates three panel 505, 510, 515, certain embodiments include more than three panels. For example, the seat of the sofa can be formed from two or more panels. In addition, the back of the sofa can be formed from two or more panels and the portion of the seat the folds behind the back (second panel 510) can be formed from two or more panels.

The fold-down seat 420 includes a folding bracket 520 configured to cause the panels 505, 510, 515 to fold into the sofa configuration and unfold into the bed configuration. The folding bracket 520 also causes the third panel to slide along a surface of the lower panel 410. The folding bracket 520 also provides a rigid support to maintain the fold-down seat 420 in the sofa configuration and provide support as a person applies pressure to a back of the fold-down seat 420, that is, as the person applies pressure to the second panel 510 when sitting. In certain embodiments, the fold-down seat 420 converts from the bed configuration into the sofa configuration as the slide-out compartment 405 is retracted into the closed state. In certain embodiments, the fold-down seat 405 retracts manually or automatically in response to a signal when suitable for a user of the RV 400. That is, when the slide-out compartment 405 is in the open state, the user may maintain the fold-down seat 405 in the bed configuration until a desired time and then, via a manual operation or through an electro-mechanical operation coupled to the folding bracket 520, cause the fold-down seat 405 to convert to the sofa configuration. It is noted that a suitable folding means can be used for causing the fold-down seat 420 to convert between a sofa configuration and a bed configuration and vice versa. For example, the folding bracket 520 can be disposed on one or more sides of the fold-down seat 420, a center line of the fold-down seat 420, multiple points under the fold-down seat 420, or a combination thereof. Additionally, the fold-down seat 420 can include coupling seams between the panels 505, 510, 515 (or the plurality of panels if more than three panels are utilized) with ribbing, levers, gears, actuators, hydraulics, or any suitable movement means as is known in the art configured to cause the second panel 510 and third panel 515 to rotate and extend to form into the bed configuration and rotate and contract to form into the sofa configuration.

When in the closed state, the slide-out compartment 405 is dimensioned such that a person inside the RV 400 can freely move about the RV 400 and sit upon the fold-down seat 420. For example, the person can sit adjacent to the fold-down seat 420, or even sit upon the fold-down seat 420, prior to, during and after deployment or retraction of the slide-out compartment 405. Additionally, the person can place objects for storage on the first panel 505 or the floor adjacent to the fold-down seat 420 before, during and after deployment or retraction of the slide-out compartment 405. Further, objects can be placed in the storage area 430 before, during and after deployment or retraction of the slide-out compartment 405. For example, when in a closed state, the slide-out compartment 405 can form a sitting area with the fold-down seat 420 included therein and, in some embodiments, a small storage area between the back of the fold-down seat 420 and the rear double doors 415.

Figure 6:
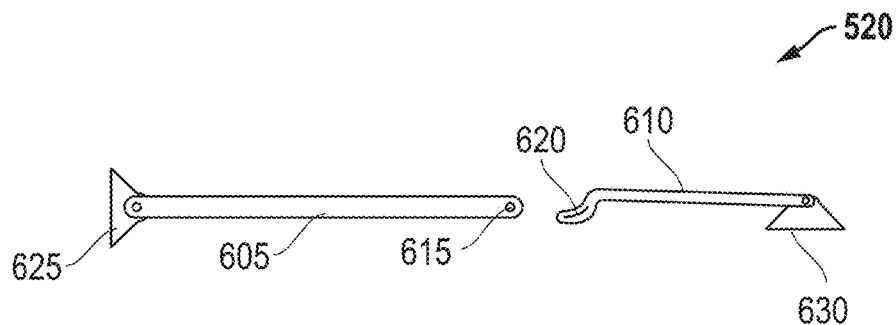
FIG. 6 illustrates a folding bracket according to embodiments of the present disclosure.

FIG. 6 illustrates a folding bracket 520 according to embodiments of the present disclosure. The embodiment of the folding bracket 520 shown in FIG. 6 is for illustration only. Other embodiments could be used without departing from the scope of the present disclosure. For example, the fold-down seat 402 can include an suitable means for causing the fold-down seat 420 to convert between a sofa configuration and a bed configuration and vice versa. The folding bracket 520 can be disposed on one or more sides of the fold-down seat 420, a center line of the fold-down seat 420, multiple points under the fold-down seat 420, or a combination thereof. Additionally, the fold-down seat 420 can include coupling seams between the panels 505, 510, 515 (or the plurality of panels if more than three panels are utilized) with ribbing, levers, gears, actuators, hydraulics, or any suitable movement means as is known in the art configured to cause the second panel 510 and third panel 515 to rotate and extend to form into the bed configuration and rotate and contract to form into the sofa configuration.

The folding bracket 520 includes a first bracket arm 605 and a second bracket arm 610. The first bracket arm 605 includes on, a first end, a coupling joint 615 configured to slideably couple to a respective receiver slot 620 at a first end of the second bracket arm 610. A second end of the first bracket arm 605 is rotateably coupled to a first mounting base 625. The first mounting brace 625 either couples to, or is part of, one of the fold-down seat 420 panels 505, 510, 515. A second end of the second bracket arm 610 is rotateably coupled to a second mounting base 630. The second mounting brace 630 either couples to, or is part of, another one of the fold-down seat 420 panels 505, 510, 515. In certain embodiments, either or both of the first bracket arm 605 and the second bracket arm 610 is coupled to a respective panel 505, 510, 515.

The coupling joint 615 slides within receiver slot 620. The receiver slot 620 includes a curve configured to cause the coupling joint 615 to slide partially in a linear direction and partially along one or more curved radii. The coupling joint 615, receiver slot 620, first mounting brace 625 and second mounting brace 630 cooperate to cause the panels 505, 510, 515 of the fold-down seat 420 to maintain a continuity during conversions of fold-down seat 420 from a sofa configuration into a bed configuration and vice versa.

For example, when the person selects to convert the fold-down seat 420 from the sofa configuration to the bed configuration, the folding bracket 520 causes a lower edge of the second panel 510 to circularly rotate about the second mounting brace 630, proximate an adjoining edge of the first panel 505. Additionally, the folding bracket 520 causes an upper edge of the second panel 510 and an upper edge of the third panel 515 to slideably rotate with respect to each other. The first mounting brace 625 slides along an upper surface of the lower panel 410, drawing a lower edge of the third panel 515 along a linear path until the third panel 515 and second panel 510 are horizontal and rest along a same planar level.

In certain embodiments, the first mounting brace 625 is fixably coupled to the rear surface of the slide-out compartment 405, such as coupled to an interior of the double doors 415. As the slide-out compartment 405 is deployed, the first mounting brace 625 draws the lower edge of the third panel 515 along a linear path until the third panel 515 and second panel 510 are horizontal and rest along a same planar level.

In certain embodiments, the second mounting brace 630 is fixably coupled to the upper surface of the lower panel 410. As the slide-out compartment 405 is deployed, the first mounting brace 625 draws the lower edge of the third panel 515 along a linear path until the third panel 515 and second panel 510 are horizontal and rest along a same planar level. The second mounting brace 630 maintains a position of lower edge of the second panel 510 and enables the second panel 510 to rotate from a vertically angular orientation of the sofa backrest into a horizontal orientation.

In certain embodiments, the first panel 505 is coupled to a mounting brace. The first panel 505 is configured to rotate about the mounting brace to provide access to one or more of the generator 435, the storage area 430, or both. In certain embodiments, one or more of the second panel 510 and third panel 515 is detachable connected to a respective one of the first mounting brace 625 and second mounting brace 630. The panels 510, 515 can rotate, or be removed, to provide access to one or more of the generator 435, the storage area 430, or both. In certain embodiments, one or more of the first mounting brace 625 and the second mounting brace 630 is detachably connected to a respective rear panel or lower panel of the slide-out compartment 405. The panels 510, 515 can rotate, or be removed, to provide access to one or more of the generator 435, the storage area 430, or both.

Figure 7:
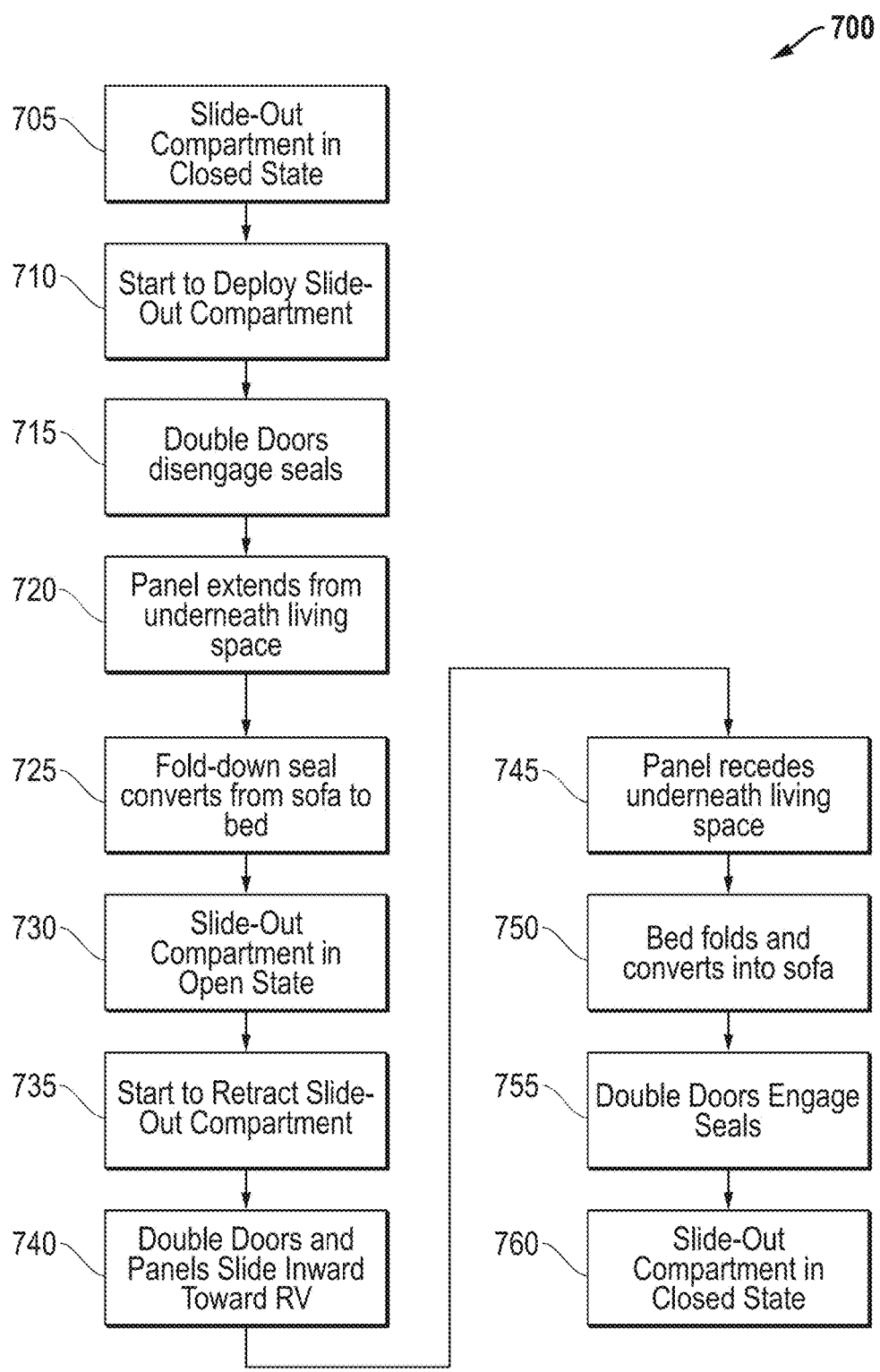
FIG. 7 illustrates a process for operating a slide-out compartment according to embodiments of the present disclosure.

FIG. 7 illustrates a process for operating a slide-out compartment 405 according to embodiments of the present disclosure. While the flowchart depicts a series of sequential steps, unless explicitly stated, no inference should be drawn from that sequence regarding specific order of performance of steps, or portions thereof, serially rather than concurrently or in an overlapping manner, or performance the steps depicted exclusively without the occurrence of intervening or intermediate steps. The process depicted in the example is implemented with a recreational van 400.

In block 705, an RV includes a slide-out compartment in a closed state. The RV may be in a driving operation, such as driving along a highway, or parked. In block 710, the slide-out compartment is deployed. An operator can engage the deployment of the slide-out compartment such as be selecting a switch on a control consol. In certain embodiments, an RV generator provides power to deploy the slide-out compartment. In certain embodiments, the RV motor generates the energy, which can be converted to electrical energy, to deploy the slide-out compartment. In block 715, during deployment, rear double doors disengage from seals surrounding a rear door jamb. A plurality of panels, coupled to the double doors, extend outward from the RV. The double doors move outward as a single unit, along with the panels extending from the RV. A lower panel of the slide-out compartment extends from underneath an existing living surface within the RV in block in block 720. For example, the lower panel can extend from beneath a seat in a rear portion of the RV. In certain embodiments, one or more of the side or roof panels is configured to extend from behind a respective side wall or roof of the RV. In block 725, a sofa seat extends and converts into a bed as the slide-out compartment extends into a fully deployed state. A first panel of the sofa seat transitions from a semi-vertical and angular orientation into a horizontal orientation. A second panel of the sofa seat also transitions from a semi-vertical and angular orientation into a horizontal orientation. In block 730, the slide-out compartment is fully deployed. The rear double doors are detached from the RV and form a rear wall of the slide-out compartment. Side panels, a roof panel and a floor panel extend between the RV and the double doors. In block 735, the slide-out compartment is retracted. An operator can engage a retraction of the slide-out compartment such as be selecting a switch on a control consol. In block 740, during retraction, the rear double doors moves toward the RV. The plurality of panels, coupled to the double doors, retract inward to the RV. The double doors move inward as a single unit, along with the panels extending from the RV. A lower panel of the slide-out compartment recedes underneath an existing living surface within the RV in block in block 745. For example, the lower panel can recede underneath a seat in a rear portion of the RV. In certain embodiments, one or more of the side or roof panels recede behind a respective side wall or roof of the RV. In block 750, a bed folds and converts into a sofa as the slide-out compartment retracts into a fully closed state. A first panel of the bed transitions from a horizontal orientation into a semi-vertical and angular orientation. A second panel of the bed also transitions from a horizontal orientation into a semi-vertical and angular orientation. In block 755, the double doors engage and compress the weather seal surrounding the rear door jamb of the RV. In block 760, the slide-out compartment is fully closed. The rear double doors are sealed against the RV and form a rear wall of the RV.

Figure 8:
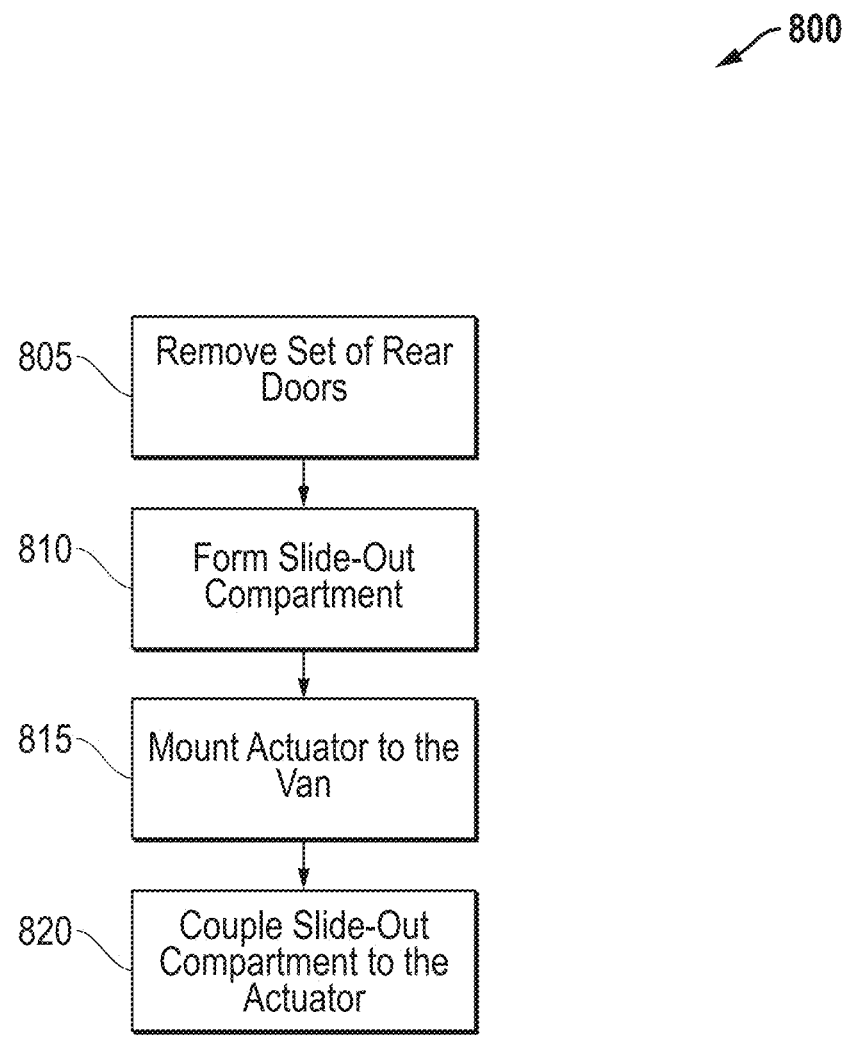
FIG. 8 illustrates a process for retrofitting a slide-out compartment of recreational van according to embodiments of the present disclosure.

FIG. 8 illustrates a process for retrofitting an RV to include a slide-out compartment according to embodiments of the present disclosure. While the flowchart depicts a series of sequential steps, unless explicitly stated, no inference should be drawn from that sequence regarding specific order of performance of steps, or portions thereof, serially rather than concurrently or in an overlapping manner, or performance the steps depicted exclusively without the occurrence of intervening or intermediate steps. The process depicted in the example is implemented with a recreational van 800.

In block 805, a set of rear double doors are removed from an RV. A set of hinges connecting the doors to the RV are disabled or removed from either or both of the double doors and the RV. The RV can be of any style and can include any number of doors. Removing the double doors leaves a door opening at the rear of the RV. In certain embodiments, modifications are made to the door opening, including widening, increasing the height, or altering the edges of the door opening to create an increasingly suitable door opening.

In block 810, the slide-out compartment is formed. The slide-out compartment is formed by constructing a plurality of panels capable of coupling the double doors at the end to provide an enclosed expanded living area once the slide-out compartment is inserted into the door opening at the rear of the RV. The double doors are mounted directly to the end of the plurality of panels. The end of the plurality of panels is modified to couple with an interior surface of the double doors.

The plurality of side walls is configured with an outer surface configured to fit inside the door opening of the RV and enclose the living space while compressing a weather seal surrounding the opening. The plurality of side walls includes a bottom panel, a first side panel, a second side panel, and a top panel. The bottom panel is disposed from a first side of the door opening to a second side of the door opening and extends from the rear panel for a length of the slide-out compartment. The first side panel is contoured to the first side of the door opening of the RV and is disposed from the bottom panel to a top side of the door opening and extends from the rear panel for the length of the slide-out compartment. The second side panel is contoured to the second side of the door opening of the RV and is disposed from the bottom panel to the top side of the door opening and extends from the rear panel for the length of the slide-out compartment. The length of the slide-out compartment is determined based on the bottom panel, the first side panel, the second side panel, and the top panel not interfering with the existing components of the RV when the slide-out compartment is in a closed state.

In block 815, a deployment system is installed in the RV. In certain embodiments, the deployment system includes a plurality of support components and an actuator mounted to the RV. In certain embodiments, the deployment system is included in the slide-out compartment.

The plurality of support components are configured to couple to the slide-out compartment in block 820. In certain embodiments, the plurality of support components are coupled to one or more of the plurality of panels, including one or more of the bottom panel, the first side panel, the second side panel, or the top panel.

In block, the slide-out compartment is coupled to the deployment system. In certain embodiments in which the deployment system is mounted to the slide-out compartment, the deployment system couples to the RV.

Although various features have been shown in the figures and described above, various changes includes be made to the figures. For example, the size, shape, arrangement, and layout of components shown in FIGS. 1A through 6 are for illustration only. Each component could have any suitable size, shape, and dimensions, and multiple components could have any suitable arrangement and layout. Also, various components in FIGS. 1A through 6 could be combined, further subdivided, or omitted and additional components could be added according to particular needs. Further, each component in a device or system could be implemented using any suitable structure(s) for performing the described function(s). In addition, while FIGS. 7-8 illustrate various series of steps, various steps in FIGS. 7-8 could overlap, occur in parallel, occur multiple times, or occur in a different order. The embodiments described herein are provided for illustration and explanation. One or more features from any of the described embodiments can be incorporated into other embodiments without departing from the scope of the disclosure.

What is claimed is:

1. A recreational vehicle (RV) comprising:
   a rear panel structure;
   a slide-out compartment configured to extend from a rear side of the RV, the slide-out compartment configured to increase a size of an interior area of the RV when the slide-out compartment is in an open state, the slide-out compartment comprising a plurality of panels coupled to the rear panel structure, the plurality of panels configured to extend from the RV in the open state and recede into the RV in a closed state, wherein the rear panel structure is configured to recess into a rear door jamb of the RV and engage a weather seal about the rear door jamb when the slide-out compartment is in a closed state and disengage from the weather seal and the door jamb when the when the slide-out compartment is not in a closed state; and
   a convertible seat structure comprising:
      a first seat panel having a first edge adjacent to a first edge of a second seat panel; and
      a folding bracket structure comprising:
         a first mounting base coupled to a lower panel of the plurality of panels proximate to the rear panel structure;
         a first bracket arm having a first end rotateably coupled to the first mounting base, the first seat panel being positioned over a top side of the first bracket arm;
         a second bracket arm having a second end that comprises a curvilinear receiving slot being rotateably and slideably coupled along the receiving slot to a second end of the first bracket arm, the second seat panel being positioned over a top side of the second bracket arm; and a second mounting base rotateably coupled to a first end of the second bracket arm and coupled to maintain a position in the RV;

wherein when the slide-out compartment is in the closed state the folding bracket structure is configured to position the first and second seat panels in a vertically angular orientation with respect to each other, and when the slide-out compartment is in a fully open state the folding bracket structure is configured to position the first and second seat panels to be adjacent to each other and nearly horizontal.

2. The RV of claim 1, wherein the lower panel of the plurality of panels of the slide-out compartment recedes beneath an interior surface of the RV, the interior surface of the RV comprising a third seat panel of the convertible seat structure, the third seat panel having a first edge adjacent to a second edge of the second seat panel.

3. The RV of claim 2, wherein the plurality of panels are configured to not interfere with the interior area or storage space within the RV during deployment or retraction.

4. The RV of claim 1, further comprising a storage area disposed between a planar level of a lower surface of the slide-out compartment and a planar level of a floorboard of the RV.

5. The RV of claim 1, wherein a top panel of the plurality of panels is configured to direct a fluid flow from a top surface of the top panel towards one or more side panels of the plurality of panels.

6. The RV of claim 1, further comprising a deployment system configured to cause the slide-out compartment to extend into an open state and retract into a closed state.

7. The RV of claim 1, wherein the rear panel structure comprises one or more doors.

8. A method for expanding a living area in a recreational vehicle (RV), the method comprising:

forming a slide-out compartment, the slide-out compartment configured to extend from a rear side of the RV and to increase a size of an interior living space of the RV, the slide-out compartment comprising a plurality of panels coupled to a rear panel structure;

coupling the slide-out compartment to the RV, wherein the plurality of panels are configured to extend from the RV in an open state and recede into the RV in a closed state, and wherein the rear panel structure is configured to recess into a rear door jamb of the RV and engage a weather seal about the rear door jamb when the slide-out compartment is in a closed state and disengage from weather seal and the door jamb when the when the slide-out compartment is not in a closed state; and providing a convertible seat structure in a seat position when the slide-out compartment in the closed state and in a bed position when the slide-out compartment is in a fully open state, wherein providing the convertible seat structure comprises providing a folding bracket structure includes:

coupling a first mounting base to a lower panel of the plurality of panels proximate to the rear panel structure;

rotateably coupling a first end of a first bracket arm to the first mounting base and positioning a first seat panel over a top side of the first bracket arm;

rotateably and slideably coupling a curvilinear slot proximate to a second end of a second bracket to a second end of the first bracket arm and positioning a second seat panel over a top side of the second bracket arm, the second seat panel having a first edge adjacent to a first edge of the first seat panel;

rotateably coupling a second mounting base to a first end of the second bracket and coupling the second mounting base to maintain a position in the RV;

moving the slide-out compartment to the closed state such that the folding bracket structure positions the first and the second seat panels in a vertically angular orientation with respect to each other placing the convertible seat structure into the seat position; and moving the slide-out compartment to the fully open state such that the folding bracket structure positions the first and the second seat panels to be positioned horizontally and adjacent to each other placing the convertible seat structure into the bed position.

9. The method of claim 8, wherein a floor of the slide-out compartment is configured to recede beneath an interior surface of the RV, the interior surface of the RV comprising a third seat panel of the convertible seat structure, the third seat panel having a first edge adjacent to a second edge of the second seat panel.

10. The method of claim 9, wherein the plurality of panels are configured to not interfere with the interior living space or storage space within the RV during deployment or retraction.

11. The method of claim 8, further comprising:

forming a storage area between a lower panel of the plurality of panels of the slide-out compartment and a floorboard of the RV, wherein the lower panel of the slide-out compartment is disposed at a first planar level above a second planar level, the second planar level corresponding to the floorboard of the RV, wherein the first planar level and the second planar level comprise a respective top and bottom of the storage area.

12. The method of claim 8, further comprising installing a deployment system configured to cause the slide-out compartment to extend into an open state and retract into a closed state.

13. The method of claim 8, further comprising:

removing double doors from the RV; and disabling hinges configured to couple the double doors to the RV, wherein forming the slide-out compartment further comprises coupling the double doors to the plurality of panels and configuring the double doors to not rotate open or closed.

14. An extension unit for use with a recreational vehicle (RV), the extension unit comprising:

a rear panel structure;

a plurality of panels coupled to the rear panel structure, the plurality of panels configured to extend from the RV in an open state and recede into the RV in a closed state, wherein the rear panel structure is configured to recess into a rear door jamb of the RV and engage a weather seal about the rear door jamb when the extension unit is in a closed state and detach from the door jamb when the when the extension unit is not in a closed state, wherein the extension unit is configured to extend from a rear side of the RV in order to increase a size of an interior living space of the RV; and a convertible seat structure comprising:

a first seat panel having a first edge adjacent to a first edge of a second seat panel, and a third seat panel having a first edge adjacent to a second edge of the second seat panel; and a folding bracket structure comprising:

a first mounting base coupled to a lower panel of the plurality of panels proximate to the rear panel structure;

a first bracket arm having a first end rotateably coupled to the first mounting base, the first seat panel being positioned over a top side of the first bracket arm;

a second bracket arm having a second end that comprises a curvilinear receiving slot being rotateably and slideably coupled along the receiving slot to a second end of the first bracket arm, the second seat panel being positioned over a top side of the second bracket arm; and a second mounting base rotateably coupled to a first end of the second bracket arm and coupled to maintain a position in the RV;

wherein when the slide-out compartment is in the closed state the folding bracket structure is configured to position the first and second seat panels in a vertically angular orientation with respect to each other, and when the slide-out compartment is in a fully open state the folding bracket structure is configured to position the first and second seat panels to be adjacent to each other and nearly horizontal.

15. The extension unit of claim 14, wherein a lower panel of the plurality of panels of the extension unit is configured to recede beneath a lower interior surface of the RV, the lower interior surface of the RV comprising the third seat panel and wherein the plurality of panels are configured to not interfere with the interior living space or storage space within the RV during deployment or retraction.

16. The extension unit of claim 14, wherein a lower panel of the plurality of panels of the extension unit is disposed at a first planar level above a second planar level, the second planar level corresponding to a floorboard of the RV, wherein the first planar level and the second planar level comprise a respective top and bottom of a storage area in the RV.

17. The extension unit of claim 14, wherein a top panel of the plurality of panels of the extension unit is configured to direct a fluid flow from a top surface of the top panel towards one or more side panels of the plurality of panels.

18. The extension unit of claim 14, further comprising a deployment system configured to couple the extension unit to the RV and to cause the extension unit to extend into an open state and retract into a closed state.

19. The extension unit of claim 14, wherein the rear panel structure comprises one or more doors.

* * * * *